United States Patent

[11] 3,629,854

[72] Inventors Erwin A. Hauck
Arcadia;
John R. Werner, Glendora, both of Calif.
[21] Appl. No. 843,345
[22] Filed July 22, 1969
[45] Patented Dec. 21, 1971
[73] Assignee Burroughs Corporation
Detroit, Mich.

[54] MODULAR MULTIPROCESSOR SYSTEM WITH RECIRCULATING PRIORITY
4 Claims, 1 Drawing Fig.

[52] U.S. Cl. .......... 340/172.5
[51] Int. Cl. .......... G06f 15/16
[50] Field of Search .......... 340/172.5; 235/157

[56] References Cited
UNITED STATES PATENTS

| | | | |
|---|---|---|---|
| 3,214,739 | 10/1965 | Gountanis et al. | 340/172.5 |
| 3,223,976 | 12/1965 | Abbott et al. | 340/172.5 |
| 3,345,618 | 10/1967 | Threadgold | 340/172.5 |
| 3,376,554 | 4/1968 | Kotok et al. | 340/172.5 |
| 3,398,405 | 8/1968 | Carlson et al. | 340/172.5 |
| 3,416,139 | 12/1968 | Marx | 340/172.5 |
| 3,421,150 | 1/1969 | Quosig et al. | 340/172.5 |

*Primary Examiner*—Raulfe B. Zache
*Assistant Examiner*—Mark Edward Nusbaum
*Attorney*—Christie, Parker & Hale

ABSTRACT: A computer having any number of processors of equal capability in the system, each processor being able to scan all peripheral devices over a common bus, with priority resolution being provided by connecting the processors in a closed loop on which is circulated a priority bit. Only the processor receiving the bit can utilize the common bus and circulation of the bit is interrupted by the processor utilizing the common bus.

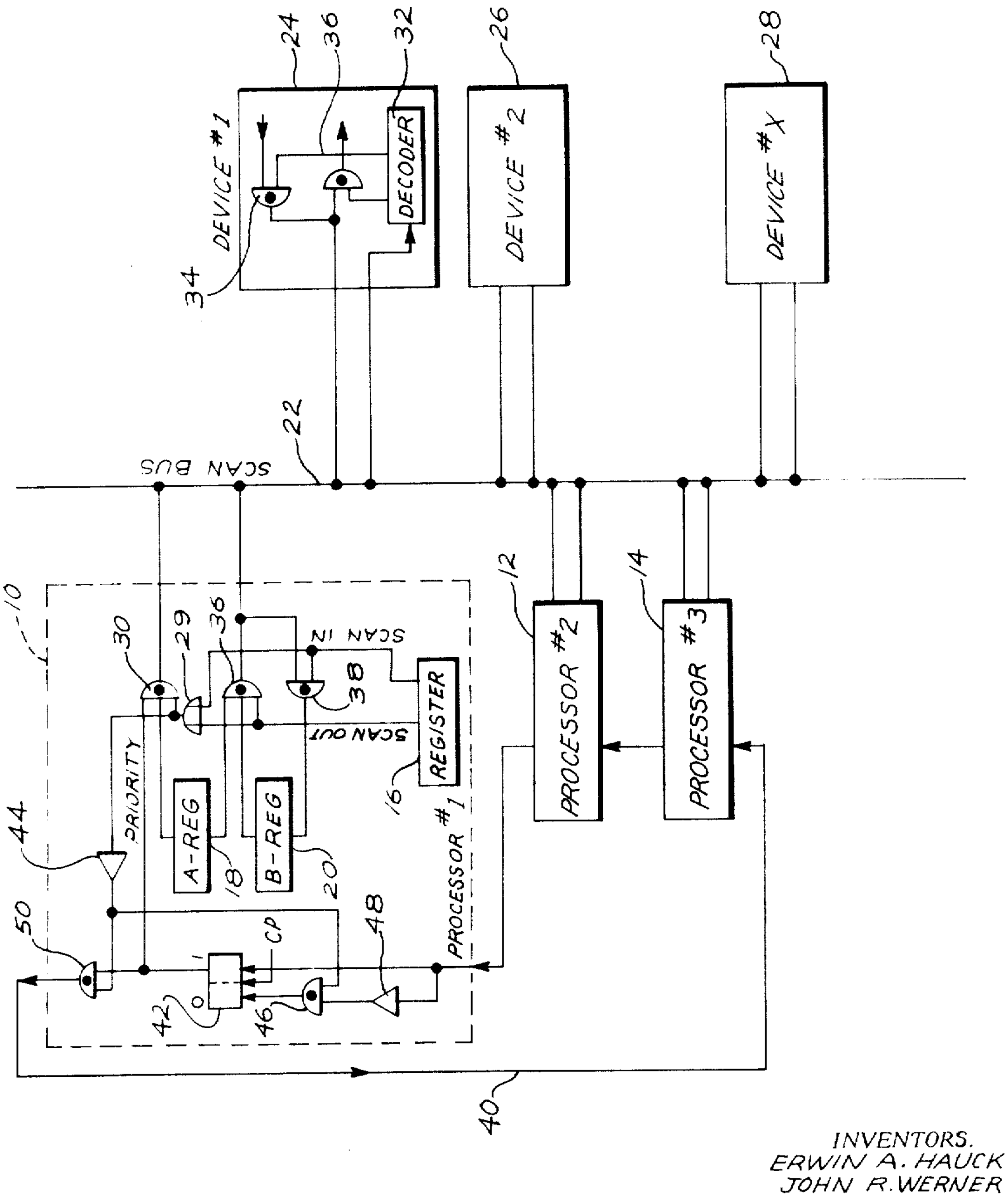
INVENTORS.
ERWIN A. HAUCK
JOHN R. WERNER
BY
Christie, Parker & Hale
ATTORNEY

MODULAR MULTIPROCESSOR SYSTEM WITH RECIRCULATING PRIORITY

FIELD OF THE INVENTION

This invention relates to digital computer systems, and more particularly, is concerned with a multiprocessor in which any number of processors can be added to the system.

BACKGROUND OF THE INVENTION

Multiprocessor computer systems are well known in which several processors share the same memory and the same input/output devices. Multiple processors permit a number of programs to be executed simultaneously; however, in past systems, generally one processor operates as the "master" processor for processing the master control program and allocating specific operations to one or more associated "slave" processors. In such an arrangement, all executive functions are performed by the master processor and all of the other processors operate merely as peripheral extensions of the master processor.

However, to provide a completely modular system in which any number of processors from one on up may be incorporated in the system, it is desirable that the hardware implementation of each processor be identical. This means that each processor must have equal capability of handling all programs including the master control program which is responsible for the job of scheduling and resource allocation of the system.

SUMMARY OF THE INVENTION

The present invention is directed to a multiprocessor computer system in which any number of identical processors can be included in the system without any modification of hardware. Each processor has equal ability to operate on any programs including the master control program. This is achieved, in brief, by providing a common bus which interconnects all processors and all system resources, such as the multiplexors through which all input/output devices communicate with main memory, data communication controls, real time clocks, and the like. Any of the processors can interrogate any of the system resources over the common bus. A priority circuit in the form of a closed loop linking each of the processors provides a circulating bit which is received by each processor in sequence. Only the processor having possession of the circulating bit has access to the common bus.

BRIEF DESCRIPTION OF THE DRAWING

For a better understanding of the invention, reference should be made to the accompanying drawing wherein the single FIGURE is a schematic block diagram of the preferred embodiment of the invention.

DESCRIPTION OF A SPECIFIC EMBODIMENT

Referring to the drawing in detail, there is shown a digital computer system which includes a number of identical processors, three of which are indicated generally at 10, 12, and 14. The storing of such processors in the system may vary from one up to any desired number N within the designed capacity of the system. Each processor may be of the type, for example, described in U.S. Pat. No. 3,200,379 which includes the capability of fetching instructions from a main memory (not shown) and storing each instruction in a command register 16 for execution by the processor. The processor normally includes an arithmetic unit and a number of registers and associated control circuitry for executing the commands. Two registers, which normally from the top two positions of a stack memory for storing operands within the processor, are indicated at 18 and 20, and are normally referred to as the A-register and the B-register, respectively.

Each of the processors is arranged to communicate with the rest of the computer system over a scan bus 22 to which are connected all the peripheral control devices which control the transfer of data between the various input/output devices and the main memory. Three such peripheral devices are indicated at 24, 26, and 28. Typical of such devices, is the multiplexor unit described in U.S. Pat. No. 3,408,632.

Interrogation of a particular peripheral device over the scan bus by any one of the processors is initiated by special instruction, which may be either a Scan-In instruction or a Scan-Out instruction. When such instruction is received in the command register 16 as the next instruction in a program being executed by a particular processor, it is decoded and provides an output signal on one of two lines from the register 16, indicated respectively as the scan-in line and the scan-out line. Either one of these instructions causes the contents of the register 18 to be applied to the scan bus through an AND-circuit 30 in response to the output of an OR-circuit 29 to which the scan-in and scan-out lines are connected. The AND-circuit 30 senses that either the scan-out or scan-in lines are true and also senses that a priority line is true. As will hereinafter be more fully explained, the priority line will be true in only one processor at a time under the control of the priority circuit. It will be understood that the register 18 stores a plurality of binary bits and that the scan bus 22 provides a plurality of parallel conductive paths for transferring each of said bits in parallel when the output of the register 18 is applied to the scan bus 22.

The contents of the A-register 18 are applied over the scan bus 22 to each of the peripheral devices and, more specifically, are applied to an address decoder in each peripheral device, such as indicated at 32 in the peripheral device 24. If the contents of the A-register 18 include the address of the particular peripheral device, the output of the decoder 32 is true. Through appropriate control logic, such as an AND-circuit 34 or an AND-circuit 36, the decoder 32 may cause input or output lines of the peripheral device to be connected to the scan bus 22. Depending upon the information stored in the A-register 18, the peripheral devices may respond in a number of ways to the interrogation by the processor, in the manner more fully described in the copending application, Ser. No. 840,393, filed July 9, 1969, now U.S. Pat. No. 3,329,038, in the names of Erwin A. Hauck, William C. Price, and Jacob F. Vigil, and assigned to the same assignee as the present invention.

During the scan-out operation, the contents of the B-register 20 are gated to the scan bus 22 by an AND-circuit 36 which is activated by the scan-out line from the command register 16. The information of the B-register 20 applied to the scan bus is coupled through the AND-circuit 36 and the particular peripheral device activated by the contents of the A-register 18 as sensed by the decoder 32 in the respective peripheral devices. Similarly, during the scan-in operation, the output of the AND-circuit 34 is coupled by the scan bus 22 to the B-register 20 through an AND-circuit 38. The AND-circuit 38 is activated by the scan-in line from the register 16. Thus, each of the processors has the capability of interrogating each of the peripheral devices independently. For example, each processor can initiate an input/output operation between a peripheral device and main memory in response to the scan-out command or may interrogate peripheral status, peripheral unit type, or the available input/output paths in response to the scan-in command, in the manner more specifically described in the above-identified copending application.

The above-described scan bus arrangement gives all processors the capability of executing the master control program since all processors have equal access to all system resources. This permits the system, in terms of hardware, to be completely modular, so that the size of the system can be expanded almost without limit. However, since more than one processor may be executing the master control program at the same time, it is possible that more than one processor may require the services of the scan bus at any given instant. Such possible conflicts are resolved by a special priority circuit which retains the complete modularity of the system.

The priority circuit is arranged such that each processor is linked to the next processor in a closed loop chain 40. The priority circuit includes within each processor a flip-flop 42. The flip-flop in only one processor at a time is set to 1 with the corresponding flip-flop in each of the other processors being set to 0. The flip-flop 42 is normally reset to 0 when the associated processor is not making an interrogation over the scan bus 22. To this end, the scan-out and scan-in lines are applied to an inverter 44, the output of the inverter being coupled to the flip-flop 42 through an AND-circuit 46. The other input to the AND-circuit 46 is derived from the priority flip-flop in the preceding processor in the chain through an inverter 48. Thus, if the command register 16 does not contain a scan-in or scan-out command, the flip-flop 42 is reset to 0 and remains off until the priority line from the preceding processor 12 in the chain goes true. This line, in addition to being applied to the inverter 48, is applied to the flip-flop 42 for setting the flip-flop to 1 in response to the next clock pulse whenever the incoming line of the chain goes true.

When the flip-flop 42 is set to 1, an output line indicating that the flip-flop 42 is turned on activates the AND-circuit 30 and also activates an AND-circuit 50 to which is also applied the output of the inverter 44. Thus, if the register 16 contains a scan-out or a scan-in command when the flip-flop 42 is set to 1, the AND-circuit 30 couples the output of the A-register 18 to the scan bus 22 in the manner described above. The flip-flop 42 remains on until the output of the AND-circuit 46 goes true, indicating the scan-in or scan-out instructions are not in the command register 16. The next clock pulse then resets the flip-flop 42 to 0. If the register 16 does not contain a scan-in or scan-out command, the AND-gate 50 goes true, providing an output signal to the next processor in the chain. The output on the chain remains true until the next clock pulse causes the flip-flop 42 to be turned off, but the same clock pulse in the next processor in the chain causes the corresponding flip-flop to be turned on. Thus, in effect, a bit is passed along the chain from processor to processor causing each flip-flop in the sequence to be turned on for one clock pulse interval unless the particular processor has a scan-in or scan-out instruction in the command register 16. In the latter case, the bit remains in that particular processor until the instruction is executed and replaced by a new instruction in the command register 16.

From the above description, it will be seen that a simple priority arrangement is provided in which the number of processors can be expanded to any number by inserting each processor in the closed loop chain. Only one processor at a time can interrogate the scan bus 22.

What is claimed is:

1. A modular computer system comprising a plurality of processors, a plurality of peripheral devices, a common bus providing an electrical signal path and having a plurality of connection points along the length of the bus to which the processors and peripheral devices are respectively connected means in each of the processors for applying when activated a binary coded address signal to the common bus, means in each of the peripheral devices for decoding the address signal on the common bus for selectively activating particular ones of the peripheral devices in response to the decoded address signals, the activated peripheral devices communicating with the processors over said common bus, and priority means for controlling the address signal coupling means in each of the processors, said priority means including means for activating the address signal coupling means in one processor at a time.

2. Apparatus as defined in claim 1 wherein said priority means further includes means for activating said address signal coupling means in each processor in sequence.

3. Apparatus as defined in claim 1 wherein the priority means includes, in each processor, means for storing a binary bit, means for transmitting said bit in the associated processor to another processor, said means for activating the address signal coupling means including means responsive to the presence of said bit in the storing means of a particular processor for activating the address signal coupling means in that processor.

4. A modular computer system in which a plurality of processors are arranged to individually transfer signals to or from a plurality of remote devices over a common bus, comprising, in each processor, means for storing a group of bits identifying any selected one of the remote devices, means generating an output signal indicating that a transfer is required, a priority control flip-flop generating an output signal indicating that the associated processor has priority, means responsive to the transfer signal and the priority signal for gating the contents of said storing means to each of the remote devices over said common bus, means connecting the priority flip-flop of each processor to the next processor to form a closed ring, means successively turning each of the flip-flops in the ring on and off with only one flip-flop being on at a time, and means responsive to said output signal when it indicates a transfer is required in a particular processor for inhibiting the turning off of the associated priority flip-flop until the transfer is complete.

* * * * *